(12) United States Patent
Knoop et al.

(10) Patent No.: US 7,015,805 B2
(45) Date of Patent: Mar. 21, 2006

(54) METHOD AND DEVICE FOR AUTOMATIC CONTROLLING OF THE DECELERATION OF A VEHICLE

(75) Inventors: Michael Knoop, Ludwigsburg (DE); Goetz Braeuchle, Reichartshausen (DE); Hermann Winner, Bietigheim (DE); Michael Weilkes, Sachsensheim (DE); Martin Heinebrodt, Stuttgart (DE); Werner Uhler, Bruchsal (DE); Wolfgang Hermsen, Kirchheim (DE); Joachim Thiele, Tamm (DE); Martin Staempfle, Ulm (DE); Fred Oechsle, Ludwigsburg (DE); Ulf Wilhelm, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/380,234

(22) PCT Filed: Jul. 11, 2002

(86) PCT No.: PCT/DE02/02545

§ 371 (c)(1),
(2), (4) Date: Sep. 18, 2003

(87) PCT Pub. No.: WO03/006290

PCT Pub. Date: Jan. 23, 2003

(65) Prior Publication Data

US 2004/0039513 A1 Feb. 26, 2004

(30) Foreign Application Priority Data

Jul. 11, 2001 (DE) ................................ 101 33 030

(51) Int. Cl.
*B60Q 1/50* (2006.01)

(52) U.S. Cl. ..................... 340/467; 340/435; 340/436; 340/903; 701/70

(58) Field of Classification Search ............... 340/467, 340/436, 435, 438, 901, 903; 701/301, 302, 701/45, 23; 180/167, 168, 169, 274
See application file for complete search history.

(56) References Cited

U.S. PATENT DOCUMENTS 5,670,953 A    9/1997   Satoh et al.
6,017,102 A *   1/2000   Aga ........................... 303/191

(Continued)

FOREIGN PATENT DOCUMENTS

DE     197 50 913     5/1998

(Continued)

OTHER PUBLICATIONS

Winner, Witte, et al., "Adaptive Cruise Control System—Aspects and Development Trends", SAE paper 96 10 10, International Congress and Exposition, Detroit, Michigan, Feb. 26-29, 1996.

*Primary Examiner*—Hung Nguyen
(74) *Attorney, Agent, or Firm*—Kenyon & Kenyon

(57) ABSTRACT

A method and a device for controlling deceleration devices of a vehicle during a braking operation, e.g., a vehicle which is equipped with a sensor for adaptive cruise control. During the braking operation, risk dimensions are determined on the basis of driving dynamics models, which are individualized by signals of the surrounding-field sensor system. A first risk dimension is precalculated for the case of continued deceleration and a second risk dimension is precalculated for the case of unbraked further movement of the vehicle. Through the comparison of the two risk dimensions, it is decided whether the automatic vehicle deceleration is to be maintained or whether the braking is to be canceled before the vehicle is brought to a standstill.

15 Claims, 3 Drawing Sheets

U.S. PATENT DOCUMENTS

| | | | | |
|---|---|---|---|---|
| 6,037,860 A | * | 3/2000 | Zander et al. | 340/436 |
| 6,084,508 A | * | 7/2000 | Mai et al. | 340/463 |
| 6,359,553 B1 | * | 3/2002 | Kopischke | 340/436 |

FOREIGN PATENT DOCUMENTS

| | | |
|---|---|---|
| EP | 0 967 121 | 12/1999 |
| EP | 1 081 004 | 3/2001 |

* cited by examiner

METHOD AND DEVICE FOR AUTOMATIC CONTROLLING OF THE DECELERATION OF A VEHICLE

FIELD OF THE INVENTION

A method and a device are for controlling deceleration devices of a vehicle during a braking operation, e.g., of a vehicle which is equipped with a sensor for adaptive cruise control. During the braking operation, risk dimensions are determined on the basis of driving dynamics models, which are individualized on the basis of signals from the surrounding-field sensor system, as well as on the basis the characteristic driver behavior to be expected, which has been obtained through analysis of the prior driver reactions. A first risk dimension is precalculated for the case of continued deceleration and a second risk dimension is precalculated for the case of unbraked further movement of the vehicle. By comparing the two risk dimensions, it is decided whether the automatic vehicle deceleration is to be maintained or whether the braking is to be canceled before the vehicle is brought to a standstill.

BACKGROUND INFORMATION

Cruise controls which reduce the set speed using a ranging sensor when a slower vehicle has been detected driving in front of the particular vehicle are believed to be known. These types of systems have been distributed under the name "adaptive cruise control" (ACC). A system of this type is described in the article "Adaptive Cruise Control System Aspects and Development Trends" by Winner et al. (SAE paper 96 1010, International Congress and Exposition, Detroit, Feb. 26–29, 1996). Systems of this type have been planned as comfort systems, due to which the maximum deceleration performance of these systems is insufficient to delay imminent collisions with vehicles driving in front.

German Published Patent Application No. 197 50 913 describes an automatic brake control system for motor vehicles which is capable of detecting obstacles and braking the particular vehicle to a standstill in the event of an imminent collision. This is done using an obstacle detection device for detecting an obstacle in front of the vehicle, a stop decision device for deciding whether the vehicle has essentially been stopped, a braking force determination device for determining a braking force to keep the vehicle stopped, a braking force control device, a travel resumption decision device, and a release device for releasing the braking force. In this system, a vehicle may be automatically braked to a standstill. However, aborting the deceleration during the braking intervention is mentioned neither in this publication nor in any other known publication.

SUMMARY

An aspect of the present invention is to be able to automatically brake vehicles, e.g., vehicles having adaptive cruise control, and at the same time to implement the braking so that the occupants may be endangered as little as possible.

The decision of whether a deceleration for avoiding collisions is to be maintained or aborted is made on the basis of a comparison of two calculated risk dimensions. A first risk dimension, which represents the risk of the particular vehicle in the event of continued deceleration, and a second risk dimension, which represents the risk of the vehicle if the brakes are opened during the deceleration, are provided.

During a braking operation, it is possible that the vehicle will begin to rotate about its vertical axis due to insufficient road-surface adhesion or if the steerable front wheels have been turned during braking. If the limit of adhesion of the tires on the roadway is reached again, these types of situations may lead to the particular vehicle becoming uncontrollable and collisions occurring with stationary or moving obstacles. In order to avoid this, it may be continuously checked during the braking maneuver to avoid a collision whether it may be more favorable in terms of safety to release the brakes and steer the vehicle in a controlled manner around the obstacle or whether it may be more favorable to maintain the emergency braking even though the brake pedal has been released by the driver and to prevent uncontrolled breakaway of the vehicle.

Furthermore, it may be provided that the automatic braking is either automatically initiated braking or braking which is initiated by the driver, but is performed automatically. Both possibilities share the feature, however, that a strong deceleration to avoid a collision or to reduce the collision speed may occur during braking, the deceleration of which corresponds to approximately the maximum possible vehicle deceleration.

Furthermore, it may be provided that the deceleration device(s) are deactivated during a braking operation if the comparison of the risk dimensions shows that the first risk dimension is greater than the second risk dimension. If the first risk dimension is smaller than the second risk dimension, the braking operation may be continued even if the driver deactivates the brake pedal during the braking operation.

The first and the second risk dimensions may be determined using precalculated movement trajectories of the detected obstacles and of the particular vehicle. For precalculating the movement trajectories, the positions and the movements of the particular vehicle and the stationary and moving obstacles in the area surrounding of the vehicle may be taken into consideration using driving dynamics models and the characteristic driver behavior to be expected.

Furthermore, it may be provided that the characteristic driving behavior of the driver is taken into consideration in establishing the particular situation. In this case, it may be taken into consideration how the driver executes steering, acceleration, and braking activities, whether they are rather slow and done as weakly as possible or abrupt and violent. It may also be taken into consideration which dynamic response the driver uses to accelerate, decelerate, or steer the vehicle on average.

Signals from at least one of the following sensors may be processed to detect the surrounding-field situation and the particular vehicle situation: yaw rate sensor, radar sensor, lidar sensor, video sensor, wheel speed sensor, steering angle sensor, accelerator pedal sensor, brake pedal sensor, and mass inertia sensor, etc. It may not be necessary according to the present invention for all of the sensor signals listed to be processed. However, it may also be possible that further signals of sensors which detect the vehicle surroundings or the particular vehicle movement are additionally taken into consideration.

The controller of the deceleration device may differentiate at least three states, the controller being able to assume precisely one of the following states at a point in time:
  no deceleration of the vehicle and no deceleration preparation,
  no deceleration of the vehicle, but preparation of the deceleration means by prefilling the braking system and applying the brake linings to the brake disks, and maximum possible deceleration of the vehicle.

Furthermore, it may be provided that the controller of the deceleration device includes at least four states, e.g., that precisely one of the following states is assumed at a point in time:

no deceleration of the vehicle and no deceleration preparation, no deceleration of the vehicle, but preparation of the deceleration device by prefilling the braking system and applying the brake linings to the brake disks, deceleration of the vehicle which is below the maximum possible deceleration of the vehicle, and maximum possible deceleration of the vehicle.

The method described may be executed by a device which provides a detection device for detecting the surrounding field situation, the situation of the particular vehicle, and the driver activities. These may be supplied to an analysis device, in which probable movement trajectories of the particular vehicle and the stationary and moving obstacles detected in the surrounding area may be established using driving dynamics models, a first and a second risk dimension are established from these movement trajectories, and device(s) for decelerating the vehicle may be activated or deactivated as a function of the result of the comparison of the first and the second risk dimensions.

The implementation of the method according to the present invention in the form of a control element which is provided for a control unit, e.g., a control unit for an adaptive cruise control, may be provided. In this case, a program is stored on the control element which is executable on a computing device, e.g., on a microprocessor or ASIC, and is capable of executing the method according to the present invention. The present invention may thus be implemented in this case by a program stored on the control element, so that this control element provided with the program represents an example embodiment of the present invention in the same manner as the method which the program is capable of executing. In particular, an electronic memory medium may be used as a control element, for example, a "read-only memory" or an "ASIC."

Further features, possible applications, and aspects of the present invention result from the following description of exemplary embodiments of the present invention, which are illustrated in the figures of the drawing. In this case, all features described or illustrated are within the scope of the present invention, alone or in any combination, regardless of their wording herein or what they are based on and regardless of their formulation and representation in the description and the drawing.

In the following description, exemplary embodiments of the present invention are described on the basis of figures.

DETAILED DESCRIPTION

Figure 1:
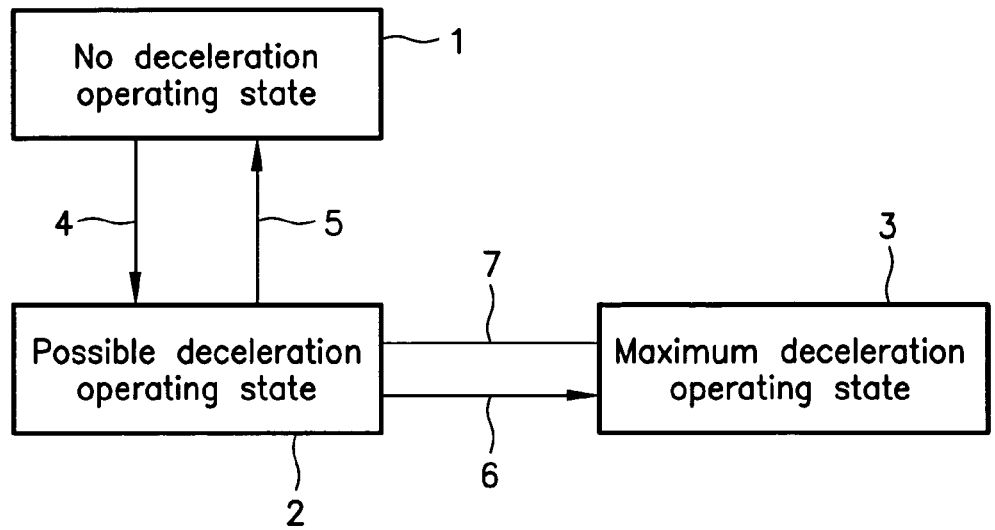
FIG. 1 schematically illustrates a state diagram for the controller of the deceleration devices having three operating states.

FIG. 1 illustrates a state transition diagram of an example embodiment for the controller of a deceleration device. In FIG. 1, block 1 represents the operating state in which no deceleration and no deceleration preparation are required. This means that the braking system is unpressurized and no braking intervention occurs. State block 2 represents the operating state in which no deceleration of the vehicle is required, but the deceleration device is prepared for a possible imminent deceleration. This is done by prefilling the braking system and applying the brake linings to the brake disks without exerting pressure on them in order to be able to cause more rapid deceleration in the event of braking. Operating state 3 in block 3 represents braking of the vehicle using a maximum possible deceleration, in order to avoid an imminent collision or to mitigate a collision which may no longer be avoidable. Transition 4 from operating state 1 into operating state 2 occurs automatically when a sensor signal determines a driving state in which an imminent collision may be expected. This may be performed by monitoring the yaw rate or the steering angle deflection, the radar, lidar, or video sensors, or the brake pedal sensor, etc. If a signal of this type exceeds a preselected threshold value or a combination of the signals exceeds a preselected combination of threshold values, the deceleration device is prepared for possible imminent emergency braking in the manner described above. If these preparation criteria of transition 4 no longer exist after a preselected time, the deceleration preparation is canceled in that the braking system is made unpressurized again. This procedure corresponds to transition 5 from operating state 2 into operating state 1. Transition 6 from operating state 2 into operating state 3 represents the initiation of a strong deceleration, in that the deceleration device prepared for a braking operation is activated and is operated using maximum possible deceleration. This is done by analyzing the sensor signals supplied to the device, in that it is recognized from one or more of these signals that a collision with a stationary or moving obstacle may be unavoidable. Transition 7 from operating state 3 to operating state 2 provides the aborting of a deceleration using maximum possible deceleration, braking preparation being maintained.

Transitions 4, 5, 6, and 7 illustrated in FIG. 1 are controlled automatically according to an example embodiment of the present invention, in that the sensor input data is analyzed in the manner according to the present invention.

Figure 2:
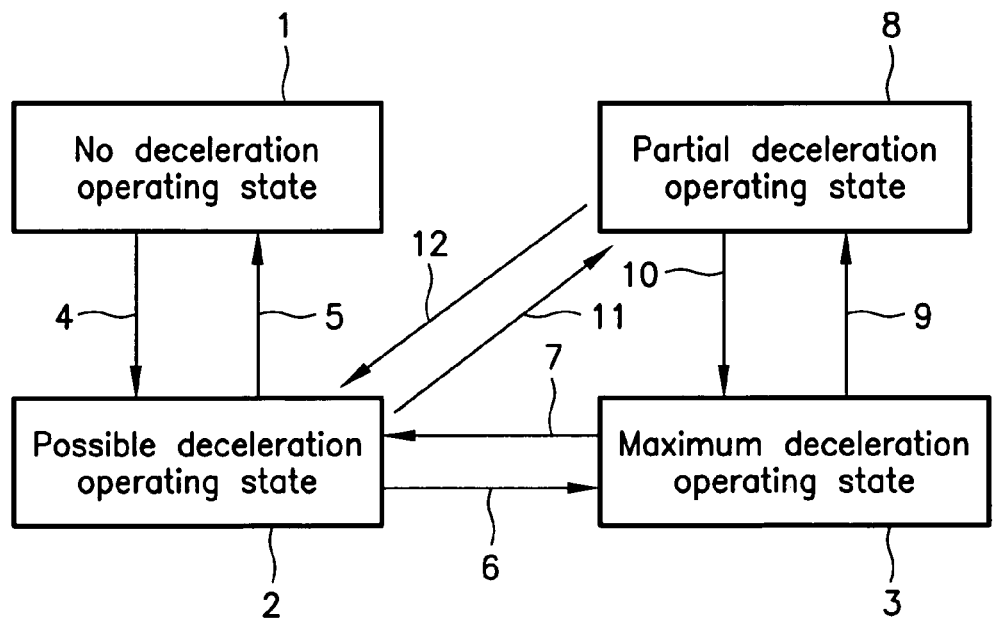
FIG. 2 schematically illustrates a state diagram for the controller of the vehicle deceleration devices having four operating states.

FIG. 2 illustrates an exemplary embodiment, a further operating state 8 for controlling the deceleration device being provided in this exemplary embodiment. This further operating state 8 represents a deceleration of the vehicle which is below the maximum possible vehicle deceleration and may therefore be described as partial deceleration. Operating states 1, 2, and 3 correspond to identical operating states 1, 2, and 3 illustrated in FIG. 1. Transitions 4, 5, 6, and 7 between the operating states also correspond to identical transitions 4 to 7 illustrated in FIG. 1. Transitions 9, 10, 11, and 12 are added. Transition 9 between operating state 3 and operating state 8 represents a reduction of the vehicle deceleration from approximately the maximum possible vehicle deceleration to a partial deceleration. Transition 10 represents the transition from state 8 to state 3 and provides an increase in the deceleration from a partial deceleration to the maximum possible vehicle deceleration. Transition 11 from state 2 to state 8 represents the initiation of a deceleration, in that the deceleration system prepared for braking begins actual deceleration of the vehicle, this vehicle deceleration corresponding to a deceleration which is below the maximum possible vehicle deceleration. State 12 in the reverse direction represents the cancellation of a partial deceleration toward further movement without deceleration, but using a braking system which is prepared for deceleration.

Operating state 8 of the state transition diagram illustrated in FIG. 2 provides decelerations which are below the maximum possible vehicle deceleration. This means that in this state 8 a variable brake pressure is possible, which may change as it is observed over time.

Figure 3:
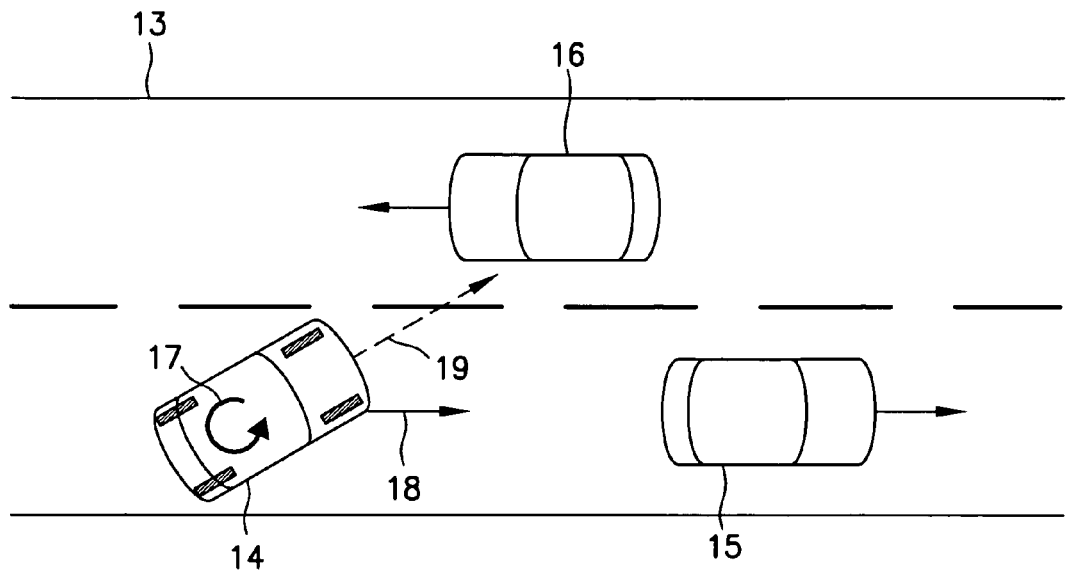
FIG. 3 schematically illustrates a driving situation in which the method according to the present invention may be used.

FIG. 3 illustrates a possible traffic situation, in which the method according to the present invention may be used. A street 13 is illustrated, one roadway being provided in each direction. Vehicle 14, which is equipped with an example embodiment of a device according to the present invention, moves on this roadway. A vehicle 15 is driving ahead of this vehicle 14, and a vehicle 16 is approaching in the opposite direction. In the indication-free operating state, the controller of the deceleration device of vehicle 14 occupies operating state 1. This means that vehicle 14 follows vehicle 15. If the surrounding-field sensor system of vehicle 14 recognizes that the hazard potential increases, which is caused, for example, by strong deceleration of vehicle 15 or by the sudden appearance of an obstacle between vehicle 14 and vehicle 15, the controller of the deceleration device enters operating state 2. This has the consequence that the deceleration device is prepared for possible imminent emergency braking, in that the braking system of the vehicle is prefilled and the brake linings are applied to the brake disks. If the risk dimension for vehicle 14 increases, two reactions are possible. Either the driver recognizes the hazard situation himself and initiates a braking operation through a corresponding brake pedal operation, or the driver does not recognize the risk dimension of this driving situation and the controller of the deceleration device automatically initiates a braking operation. In the further course of these two possible braking operations, the surrounding-field sensor system determines risk dimensions, from the recognized obstacles, in this example vehicles 15 and 16 or a suddenly appearing obstacle between vehicles 14 and 15, for a continued deceleration and for an abort of the deceleration. To determine these risk dimensions, the positions and speeds of the obstacles are determined using the surrounding-field sensor system and their further movement trajectories are precalculated. In the course of the deceleration operation, it may occur that the road-surface adhesion of the wheels of vehicle 14 loses adhesion and the vehicle begins to skid. This is indicated in the exemplary situation, as is illustrated in FIG. 3, by arrow 17, which represents a movement of the vehicle about its vertical axis. In this situation, the method according to the present invention may ensure that when the road-surface adhesion of the wheels sets in again, the vehicle does not move further onto the opposite roadway. For this purpose, it may be necessary not to abort the braking for avoiding a collision, but rather to continue to a standstill, even if the driver lets up the brake pedal and desires an end to the deceleration.

Figure 4:
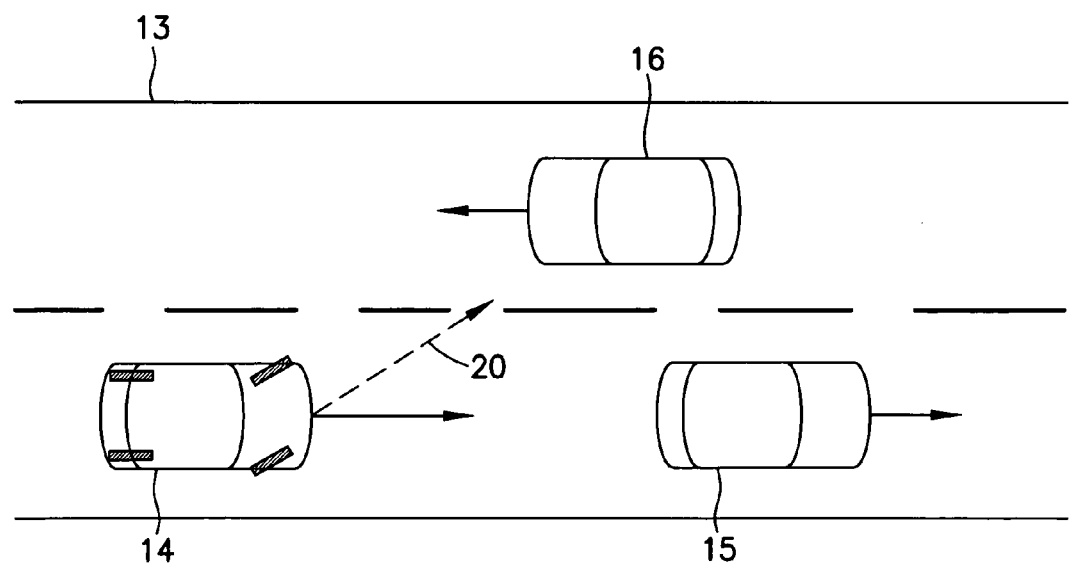
FIG. 4 schematically illustrates a traffic situation in which the method according to the present invention may be used.

In FIG. 4 a further traffic situation is illustrated in which the method according to the present invention may be used. A roadway 13 is illustrated which has one lane in each direction of travel. Vehicle 14, which is equipped with an example embodiment of a device according to the present invention, a vehicle 15 driving in front of this vehicle, and a vehicle 16, which approaches on the opposite lane, are located on these lanes. The movement directions of the vehicles are indicated by arrows in the figure. In this figure, the surrounding-field sensor system of vehicle 14 detects the traffic situation in the detection range of the vehicle and analyzes this situation with regard to the risk dimension. If the risk dimension increases, for example, due to strong braking of vehicle 15 driving ahead or a suddenly appearing obstacle between vehicles 14 and 15, the controller of the deceleration device enters state 2 from state 1, in that the braking device is prepared for a deceleration. If the hazard potential increases in the further course of this situation or the driver of vehicle 14 initiates deceleration by a brake pedal operation, using which a collision is to be avoided, the controller of the deceleration device enters state 3 from state 2, as illustrated in FIG. 1, or enters state 8 or 3 from state 2, as illustrated in FIG. 2. As a consequence of this strong deceleration, the wheels of vehicle 14 may lose road-surface adhesion. Furthermore, it is possible that the driver of vehicle 14 wishes to perform an avoidance maneuver through a steering intervention and therefore turns the steerable front wheels. In this case, if the decelerated wheels regained road-surface adhesion, the vehicle may abruptly continue the movement direction in the direction of dashed arrow 20 as a consequence of the steering deflection. In the case of an approaching vehicle 16, this may end in a collision with this vehicle. In order to avoid this, the surrounding-field sensor system of vehicle 14 observes the current driving events and evaluates the situation for continued deceleration using a first risk dimension and for an aborted braking situation using a second risk dimension. In this case, the second risk dimension may be greater than the first, since a collision may be unavoidable in the event of an abort of the deceleration operation. In this case, the controller of the deceleration device may continue the braking operation, even if the driver indicated a desire for aborting deceleration by letting off the brake pedal. However, a traffic situation is also possible, using braking to avoid a collision, in which the driver maintains the brake pedal operation, through which a second risk dimension may arise which may be greater than the first risk dimension of continued emergency braking. In this case, the controller of the deceleration device may abort the braking operation, even if the driver continued to operate the brake pedal. The driver thus intuitively receives the possibility of performing an avoidance maneuver, the risk dimension of which may be below a continued braking operation. The controller of the deceleration device therefore has the possibility of independently deciding whether it is more favorable in case of an imminent collision to continue the deceleration, in order to further reduce a possible collision speed, or whether it may be more favorable to abort the deceleration and open the possibility of an avoidance maneuver to the driver. In particular in vehicles which are not equipped with electronic driving dynamics controllers, this method may offer an increase in the driving safety.

Figure 5:
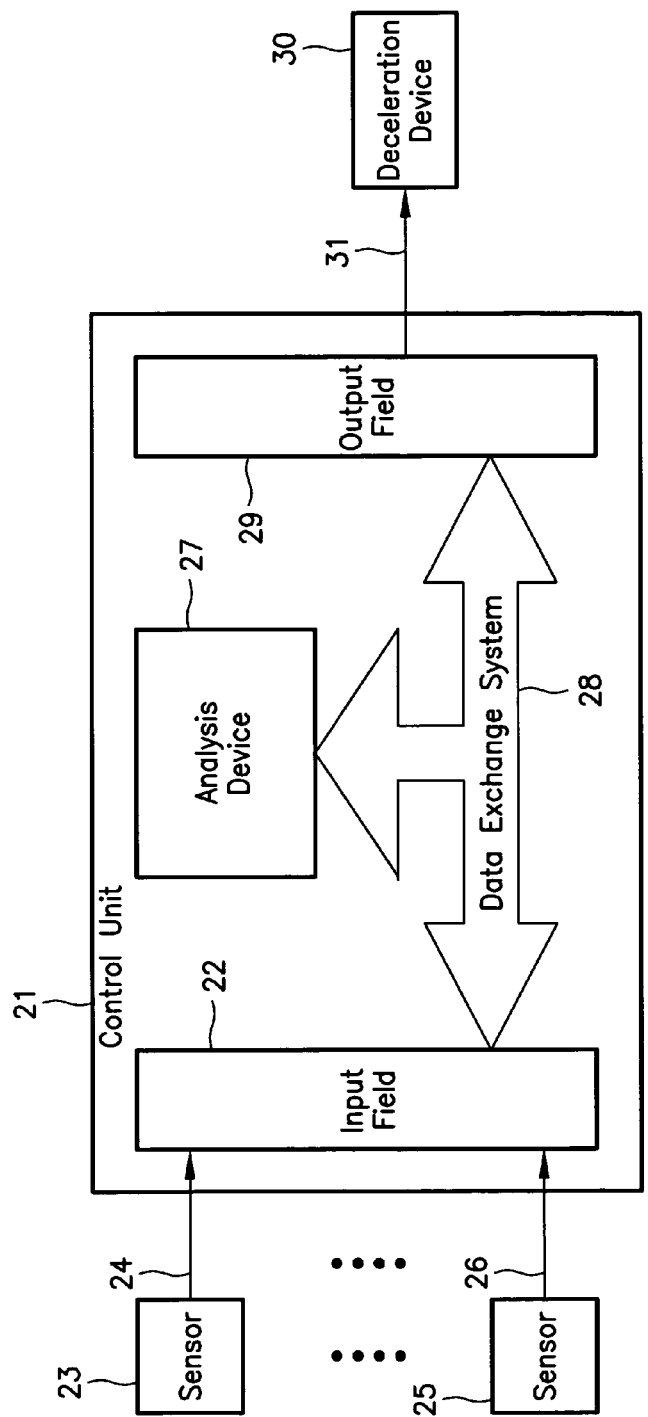
FIG. 5 is a block diagram of an example embodiment of a device according to the present invention.

The schematic construction of a device according to an example embodiment of the present invention for performing the method according to an example embodiment of the present invention is illustrated in FIG. 5. In a control unit 21 for controlling the deceleration device, an input field 22 is provided, among other things. This input field 22 receives signals 24 to 26 from various sensors 23 to 25. Sensors 23 to 25 may be one or more of the following devices: yaw rate sensor, radar sensor, lidar sensor, video sensor, wheel speed sensor, steering angle sensor, accelerator pedal sensor, brake pedal sensor, and mass inertia sensor, etc. Signals 24 to 26 provided by these sensors are relayed to input field 22, from where they are supplied to an analysis device 27 using a data exchange system 28. This analysis device 27 may be a microprocessor or an ASIC, etc. The movement trajectories of the stationary or moving obstacles detected by at least one of sensors 23 to 25 are precalculated on the basis of driving dynamics models in this analysis device 27. Using these precalculated movement trajectories, a first risk dimension for continued deceleration and a second risk dimension for aborted deceleration may be determined. By comparing these two risk dimensions, analysis device 27 decides whether the deceleration is to be continued or aborted. Depending on the result of the decision, a signal 31 which controls deceleration device 30 is supplied via data exchange device 28 to output field 29.

What is claimed is:

1. A method for automatically controlling deceleration devices of a vehicle during automated braking, comprising:
    detecting a surrounding-field situation and a particular situation by detection devices before and during automated braking of the vehicle involving all wheels of the vehicle;
    determining a first risk dimension for continued deceleration of the vehicle and a second risk dimension for unbraked further movement of the vehicle in accordance with the detected situations; and
    deciding whether the deceleration devices remain activated or are deactivated in accordance with a comparison of the first risk dimension and the second risk dimension.

2. The method according to claim 1, wherein the automated braking includes an automatically controlled deceleration one of to avoid a collision and to reduce a collision speed.

3. The method according to claim 1, further comprising deactivating the deceleration devices during a braking operation if the comparison of the risk dimensions indicates that the first risk dimension is greater than the second risk dimension.

4. The method according to claim 1, wherein the first and second risk dimensions are determined in the determining step in accordance with precalculated movement trajectories of detected obstacles.

5. The method according to claim 4, further comprising precalculating the movement trajectories, the precalculating including taking into consideration positions and movements of the vehicle and at least one of stationary and moving obstacles in an area surrounding the vehicle in accordance with driving dynamics models.

6. The method according to claim 1, further comprising establishing the particular situation including taking into consideration a characteristic driving behavior of a driver.

7. The method according to claim 1, wherein the surrounding-field situation and the particular situation detecting includes processing signals from at least one of a yaw rate sensor, a radar sensor, a lidar sensor, a video sensor, a wheel speed sensor, a steering angle sensor, an accelerator pedal sensor, a brake pedal sensor and a mass inertia sensor.

8. The method according to claim 1, wherein a controller of the deceleration device includes at least three states.

9. The method according to claim 8, wherein the states include:
    no deceleration of the vehicle and no deceleration preparation;
    no deceleration of the vehicle and preparation of the deceleration device by prefilling a braking system and applying brake linings to brake disks; and
    maximum possible deceleration of the vehicle.

10. The method according to claim 1, wherein a controller of the deceleration devices includes at least four states.

11. The method according to claim 10, wherein the states include:
    no deceleration of the vehicle and no deceleration preparation;
    no deceleration of the vehicle and preparation of the deceleration device by prefilling a braking system and applying brake linings to brake disks;
    deceleration of the vehicle below a maximum possible deceleration of the vehicle; and
    maximum possible deceleration of the vehicle.

12. A device for automatically controlling deceleration devices of a vehicle, comprising:
    a detection arrangement configured to detect a surrounding-field situation, a vehicle situation and driver activities;
    an analysis device configured to receive the surrounding-field situation, the vehicle situation and the driver activities and to establish probable movement trajectories in accordance with driving dynamics models;
    an arrangement configured to establish a first risk dimension and a second risk dimension based on the movement trajectories; and
    an arrangement configured to decelerate the vehicle by braking all wheels of the vehicle and configured to be one of activated and deactivated as a function of a result of a comparison of the first and the second risk dimensions.

13. The device according to claim 12, wherein the deceleration includes a braking operation to one of avoid a collision and to reduce a collision speed.

14. A device for automatically controlling deceleration devices of a vehicle, comprising:
    means for detecting a surrounding-field situation, a vehicle situation and driver activities;
    analysis means for receiving the surrounding-field situation, the vehicle situation and the driver activities and for establishing probable movement trajectories in accordance with driving dynamics models;
    means for establishing a first and a second risk dimension from the movement trajectories; and
    means for decelerating the vehicle by braking all wheels of the vehicle and that is one of activated and deactivated as a function of a result of a comparison of the first and second risk dimensions.

15. The device according to claim 14, wherein the deceleration includes a braking operation to one of avoid a collision and to reduce a collision speed.

* * * * *